United States Patent
Kobayashi et al.

(10) Patent No.: US 7,225,527 B2
(45) Date of Patent: Jun. 5, 2007

(54) METHOD OF MANUFACTURING MAGNETIC TAPE

(75) Inventors: Nobuyuki Kobayashi, Odawara (JP); Masanori Yamamoto, Odawara (JP)

(73) Assignee: Fujifilm Corporation, Tokyo (JP)

( * ) Notice: Subject to any disclaimer, the term of this patent is extended or adjusted under 35 U.S.C. 154(b) by 277 days.

(21) Appl. No.: 10/406,239

(22) Filed: Apr. 4, 2003

(65) Prior Publication Data

US 2003/0188612 A1 Oct. 9, 2003

(30) Foreign Application Priority Data

Apr. 4, 2002 (JP) .............................. 2002-101976

(51) Int. Cl.
*G11B 5/127* (2006.01)
*B26D 3/00* (2006.01)
(52) U.S. Cl. .............. 29/603.16; 29/603.2; 29/603.12; 83/56
(58) Field of Classification Search ............ 29/603.12, 29/603.16, 603.2; 83/56, 21.29, 33, 872, 83/468.8, 468.93, 483, 495, 21, 233, 345, 83/497, 496, 508.3, 698.51, 13; 360/135, 360/251.2, 256.2, 252.2; 428/141
See application file for complete search history.

(56) References Cited

U.S. PATENT DOCUMENTS

| | | | | |
|---|---|---|---|---|
| 3,695,131 A | * | 10/1972 | Zimmermann | ............... 83/56 |
| 4,580,336 A | * | 4/1986 | Kerley et al. | ............... 29/605 |
| 5,152,471 A | * | 10/1992 | Goerner | ............... 242/530.4 |
| 5,327,806 A | * | 7/1994 | Houser | ............... 83/636 |
| 5,423,239 A | * | 6/1995 | Sakai et al. | ............... 83/56 |
| 5,512,350 A | * | 4/1996 | Ryoke et al. | ............... 428/141 |
| 5,873,293 A | * | 2/1999 | Yamazaki | ............... 83/497 |
| 6,627,334 B2 | * | 9/2003 | Iida et al. | ............... 428/847 |

FOREIGN PATENT DOCUMENTS

JP 638008 U 5/1994

* cited by examiner

*Primary Examiner*—A. Dexter Tugbang
*Assistant Examiner*—Tai Van Nguyen
(74) *Attorney, Agent, or Firm*—Sughrue Mion, PLLC

(57) ABSTRACT

When a magnetic tape material is slit into a plurality of magnetic tapes, projections are formed in edge portions of side surfaces of the magnetic tapes. The projections are removed by pressing cutting tools against the edge portions of the side surfaces of the magnetic tape while transporting the magnetic tape. Thus, product quality of the magnetic tape is improved.

7 Claims, 6 Drawing Sheets

FIG.6
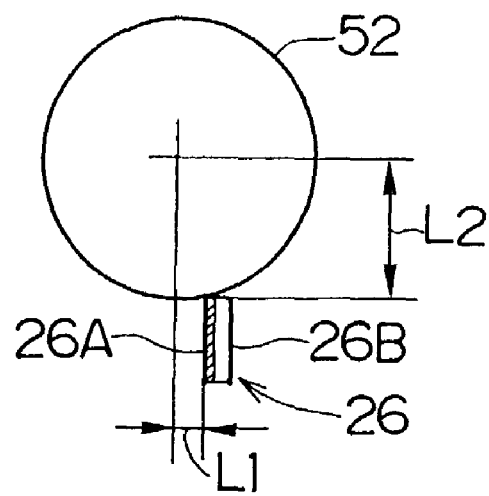
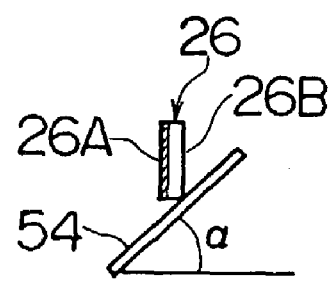
FIG.7(a)
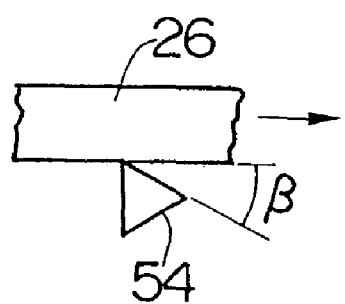
FIG.7(b)

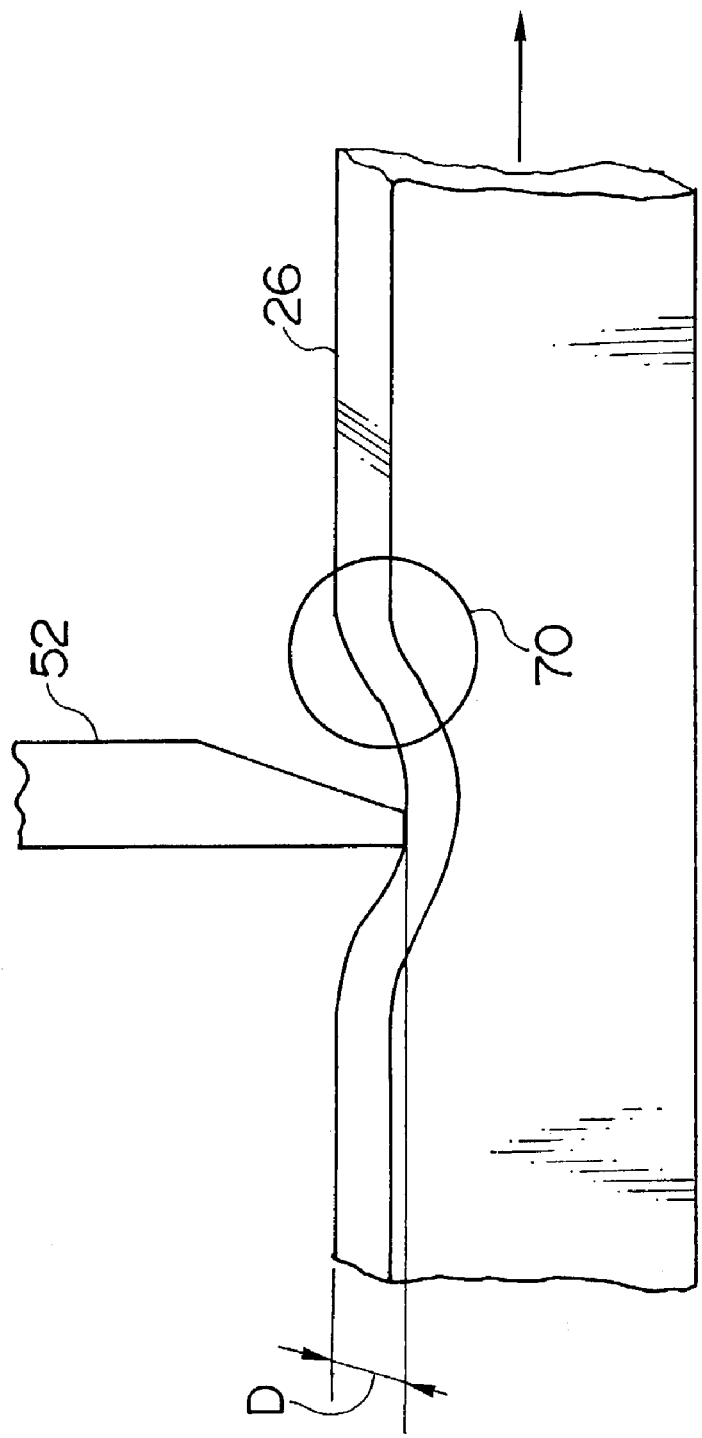

METHOD OF MANUFACTURING MAGNETIC TAPE

BACKGROUND OF THE INVENTION

1. Field of the Invention

The present invention relates to a method of manufacturing magnetic tape and, more particularly, to a method of manufacturing magnetic tape such as tape for computer data backup, audiotape and videotape.

2. Description of the Related Art

In a method of manufacturing various types of magnetic tape such as tape for computer data backup, audiotape and videotape, a wide web-like magnetic tape material wound in roll form is drawn out from the delivery side, and slit into a plurality of narrow magnetic tapes by use of a slitter while being transported, and the magnetic tapes are wound on cores on the winding side.

As shown in FIG. 2, a conventional slitter used in the manufacturing of magnetic tapes is a device 14 that slits a wide web-like magnetic tape material 20 into a plurality of magnetic tapes 26 by use of pairs of upper and lower rotary blades. The rotary blades are generally constituted by a plurality of rotary blades 30 formed as bed knives in roller form and a plurality of rotary blades 32 in thin disk form, which perform slitting by giving a shearing force to the magnetic tape material 20 between the rotary blades 30 and the rotary blades 32.

However, when the magnetic tape material 20 is slit by the slitter 14, the side surfaces of the magnetic tapes 26 cannot be precisely cut, so that projections often occur in the edge portions of the side surfaces. FIG. 3 is an enlarged fragmentary view of FIG. 2 and shows the positional relationship between the magnetic tapes 26 and a pair of upper and lower rotary blades 30 and 32. FIG. 4 is an enlarged sectional view showing the sectional shape of the right and left side surfaces of the magnetic tape 26. The magnetic tape 26 is composed of two layers, i.e., a magnetic layer 26A on the front side and a nonmagnetic backing layer 26B on the back side. In FIGS. 2, 3 and 4, the running direction of the magnetic tape 26 is perpendicular to the drawing sheets.

Since the magnetic tapes 26 are made by slitting the magnetic tape material 20 in a stretched sate with the upper rotary blades 32 as shown in FIG. 3, each of the edge portion of the magnetic layer 26A at an upper right part and the edge portion of the nonmagnetic layer 26B at a lower left part in FIG. 4 has a projection, and each portion of adjacent magnetic tapes 26 corresponding to the projection has a nick. Therefore, the section of the magnetic tape 26 as a whole assumes a roughly parallelogrammatic shape.

When the magnetic tape 26 has such a sectional shape, the projections are often scraped off the magnetic tape 26 during a run on a tape deck, and dust produced from the removed projections causes troubles such as signal dropout (DO) and clogging of the head in the tape deck. Although such troubles have so far been coped with by measures such as optimization of the setting conditions of the slitter, etc., a fundamental solution has not been reached and there has been a strong requirement for improvement.

SUMMARY OF THE INVENTION

The present invention was made in view of the above-described situation and has as its object the provision of a method of manufacturing a magnetic tape which can improve product quality by removing projections which occur in edge portions of side surfaces of the magnetic tape when the magnetic tape is made by slitting a magnetic tape material into a plurality of narrow magnetic tapes.

In order to attain the above-described object, the present invention is directed to a method of manufacturing magnetic tape, comprising the steps of: transporting a magnetic tape made by slitting a magnetic tape material; and pressing a cutting tool against an edge portion of a side surface of the magnetic tape being transported, thereby removing a projection formed in the edge portion of the side surface of the magnetic tape due to the slitting.

According to the present invention, during a run of a magnetic tape immediately after being made by slitting a magnetic tape material with a slitter or during a run of a magnetic tape when the magnetic tape is unwound from a magnetic tape reel after being made by slitting a magnetic tape material with a slitter and winding on the reel (such a tape being generally called a pancake), a projection formed by the slitting on an edge portion of a side surface of the magnetic tape can be removed by pressing a cutting tool against the edge portion, so that the product quality of the magnetic tape can be easily improved without making a sacrifice of productivity.

Preferably, the cutting tool to remove the projection on a magnetic layer of the magnetic tape is a rotary circular blade rotating on an axis substantially parallel to a running direction of the transported magnetic tape. It has been ascertained as a result of trial and error that the rotary circular blade of this construction is most favorable for the removal of the projection on the magnetic layer.

Preferably, the cutting tool to remove the projection on a nonmagnetic backing layer of the magnetic tape is a fixed blade made of a hard material. This is because the nonmagnetic backing layer has a lower hardness than that of the magnetic layer and hence can be removed even by such a fixed blade.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 is a conceptual diagram showing the positional relationship between a rotary circular blade and a magnetic tape;

FIGS. 7(a) and 7(b) are conceptual diagrams showing the positional relationship between a fixed blade and a magnetic tape; and FIG. 8 is a conceptual diagram showing a method of controlling a rotary circular blade.

DETAILED DESCRIPTION OF THE PREFERRED EMBODIMENTS

A preferred embodiment of a method of manufacturing magnetic tape according to the present invention will be described in detail below by referring to the attached drawings.

Figure 1:
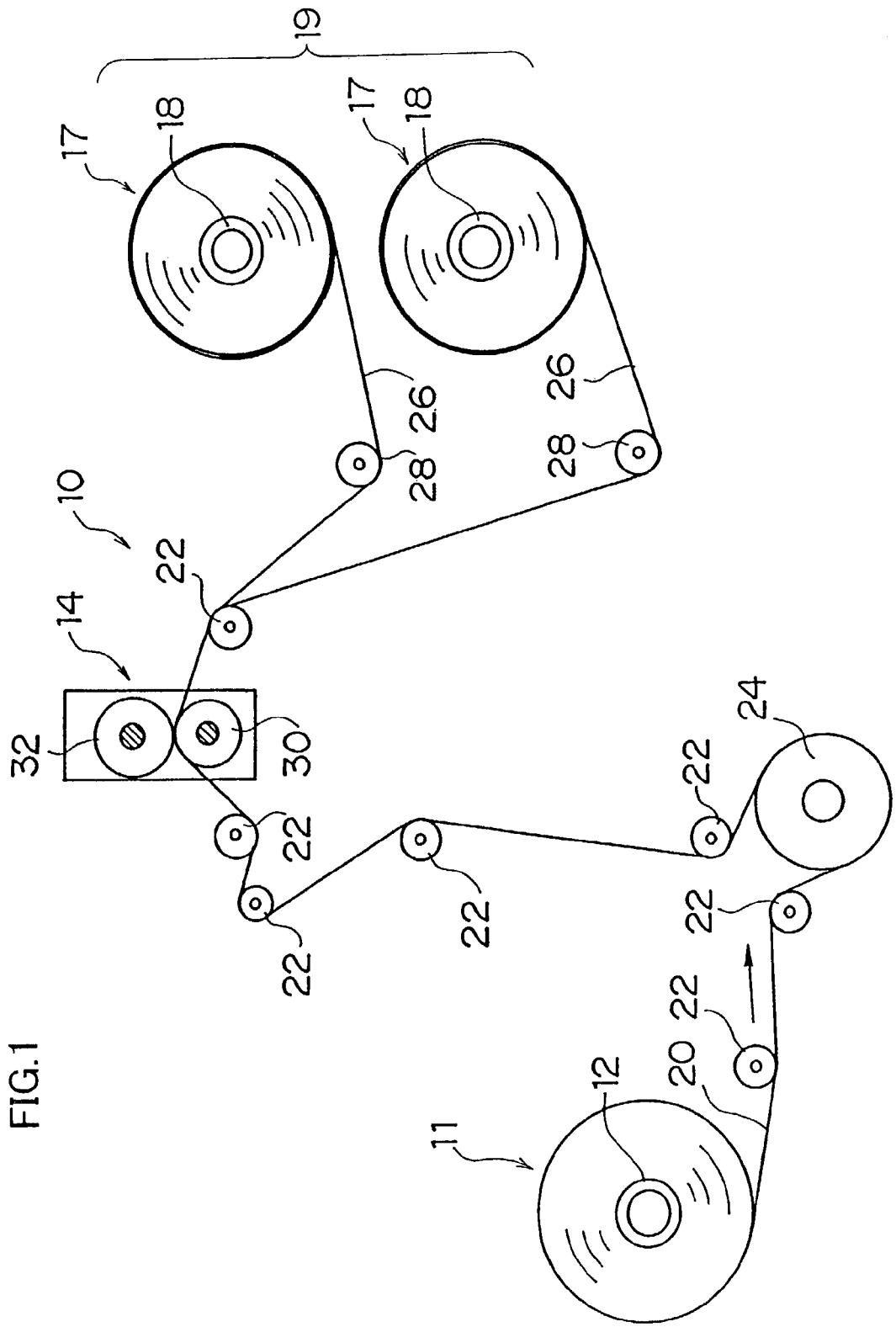
FIG. 1 is a view showing the construction of a magnetic tape manufacturing device used in the invention.
Figure 2:
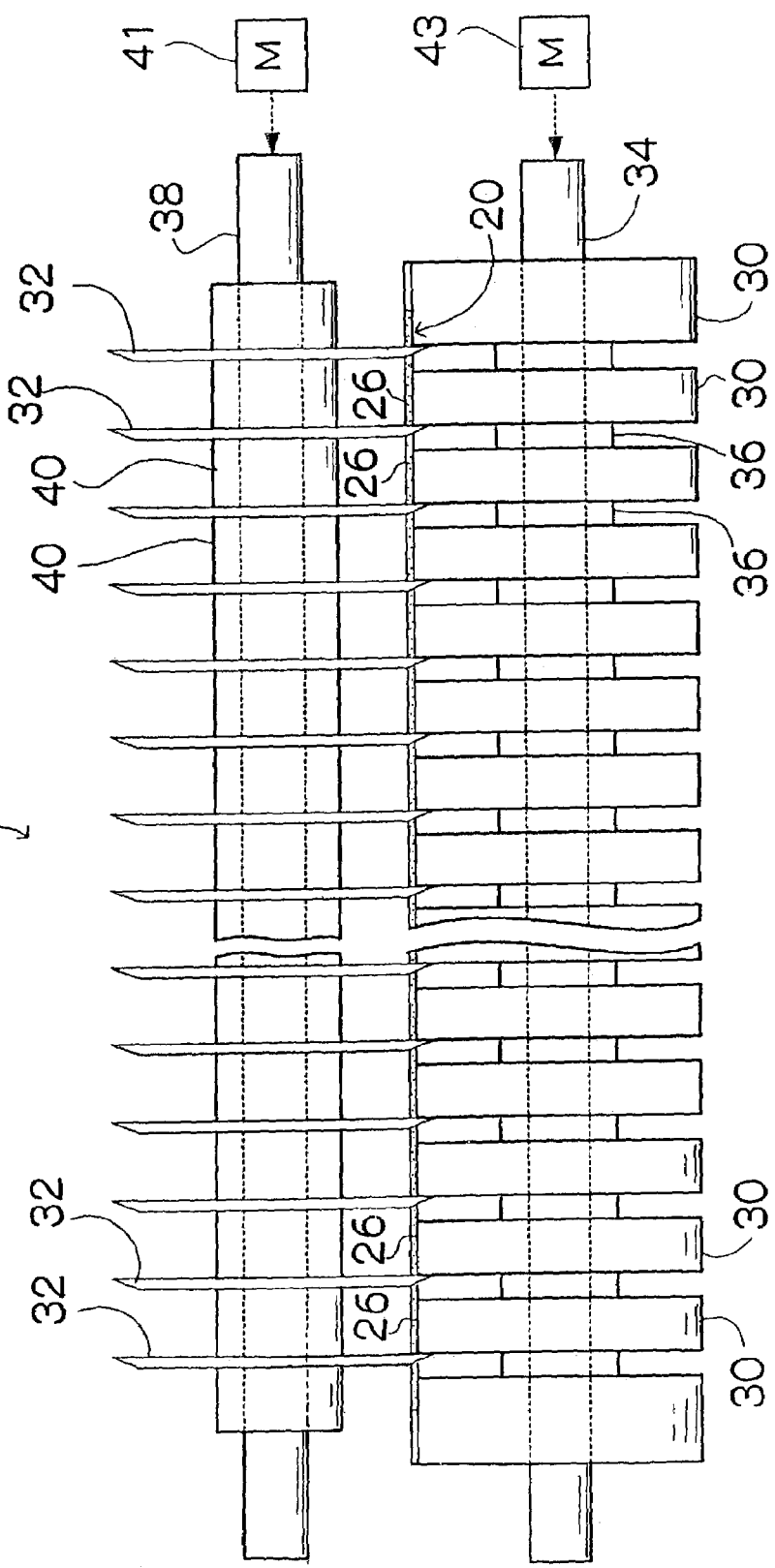
FIG. 2 a side view of a slitter.
Figure 3:
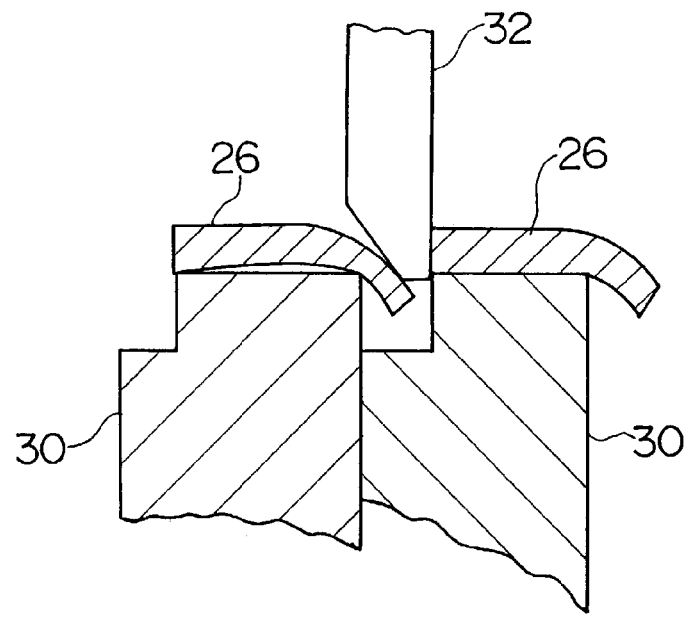
FIG. 3 is an enlarged fragmentary view of FIG. 2.
Figure 4:
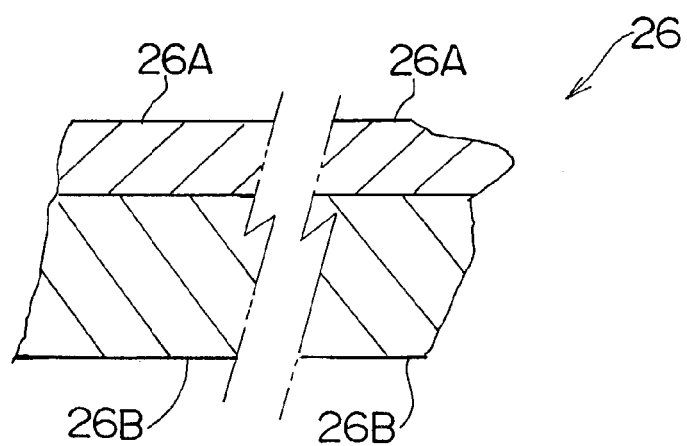
FIG. 4 is an enlarged sectional view of a magnetic tape.

A magnetic tape manufacturing device 10 to which an embodiment according to the method of manufacturing magnetic tape of the present invention is applied, which is shown in FIG. 1 as an example, comprises a slitter 1, which slits a wide web-like magnetic tape material 20 into a plurality of narrow magnetic tapes 26, and a winding device 19, which winds the magnetic tapes 26 on reels. FIG. 2 is a schematic diagram showing an example of the slitter 14.

As shown in FIG. 1, the magnetic tape material 20 wound in roll form is attached to a hub 12 (a core) of an unwinding reel 11. Usually, the magnetic tape material 20 is manufactured by forming a magnetic layer containing ferromagnetic particles on a nonmagnetic backing layer by the application process, the vacuum deposition process, etc. and by subjecting the magnetic layer to orientation treatment, drying treatment, surface treatment, etc.

The slitter 14 has a plurality of pairs of upper and lower rotary blades 30 and 32 to slit the wide web-like magnetic tape material 20 into the plurality of narrow magnetic tapes 26, 26, . . . by giving a shearing force to the magnetic tape material 20 between the lower rotary blades 30 and the upper rotary blades 32. As shown in FIG. 2, the plurality of lower rotary blades 30, 30, . . . are formed as bed knives in roller form, and the plurality of upper rotary blades 32, 32, . . . are formed as thin disks.

The lower rotary blades 30 are engaged and fixed to a lower shaft 34 with spacers 36, and the upper rotary blades 32 are engaged and fixed to an upper shaft 38 parallel to the lower shaft 34 with spacers 40. The lower rotary blades 30 and the upper rotary blades 32 are arranged so that their sharp edges work one against the other. The upper rotary blades 32 are urged by a spring (not shown) toward the right side in FIG. 2 along the shaft 38 and positioned with the cutting edge portions of the upper rotary blades 32 abutting against the cutting edge portions of the lower rotary blades 30. The upper shaft 38 and the lower shaft 34 are respectively connected to motors 41 and 43, which can vary rotational speed freely so that the peripheral speed of the upper rotary blades 32 and the peripheral speed of the lower rotary blades 30 can be individually varied.

Between the unwinding reel 11 and the slitter 14 are arranged a plurality of guide rollers 22, 22, . . . , which constitute a transporting path of the magnetic tape material 20, and a grooved suction drum 24, which controls the transporting speed of the magnetic tape material 20. The grooved suction drum 24 is connected to a motor (not shown) capable of varying rotational speed freely, and appropriately varies the transporting speed of the magnetic tape material 20 by rotating with the magnetic tape material 20 sucked on the peripheral surface of the grooved suction drum 24.

The rotational speed of a hub 18 (a core) of a winding reel 17 is controlled on the basis of the peripheral speed of the grooved suction drum 24. A device which controls the transporting speed of the magnetic tape material 20 is not limited to the grooved suction drum 24, and it is also possible to use other mechanisms such as a pair of a capstan and a pinch roller which pinch and transport the magnetic tape material 20.

Between the slitter 14 and each of the winding reels 17 is arranged a tension roller 28 so that the tension in the transporting direction of the magnetic tape material 20 during slitting is appropriately adjusted.

In the magnetic tape manufacturing device 10 described above, a projection removal device 50 (not shown in FIG. 1) which removes projections formed in the edge portions of the side surfaces of the magnetic tape 26 may be arranged in an appropriate position upstream or downstream of the tension roller 28.

Figure 5:
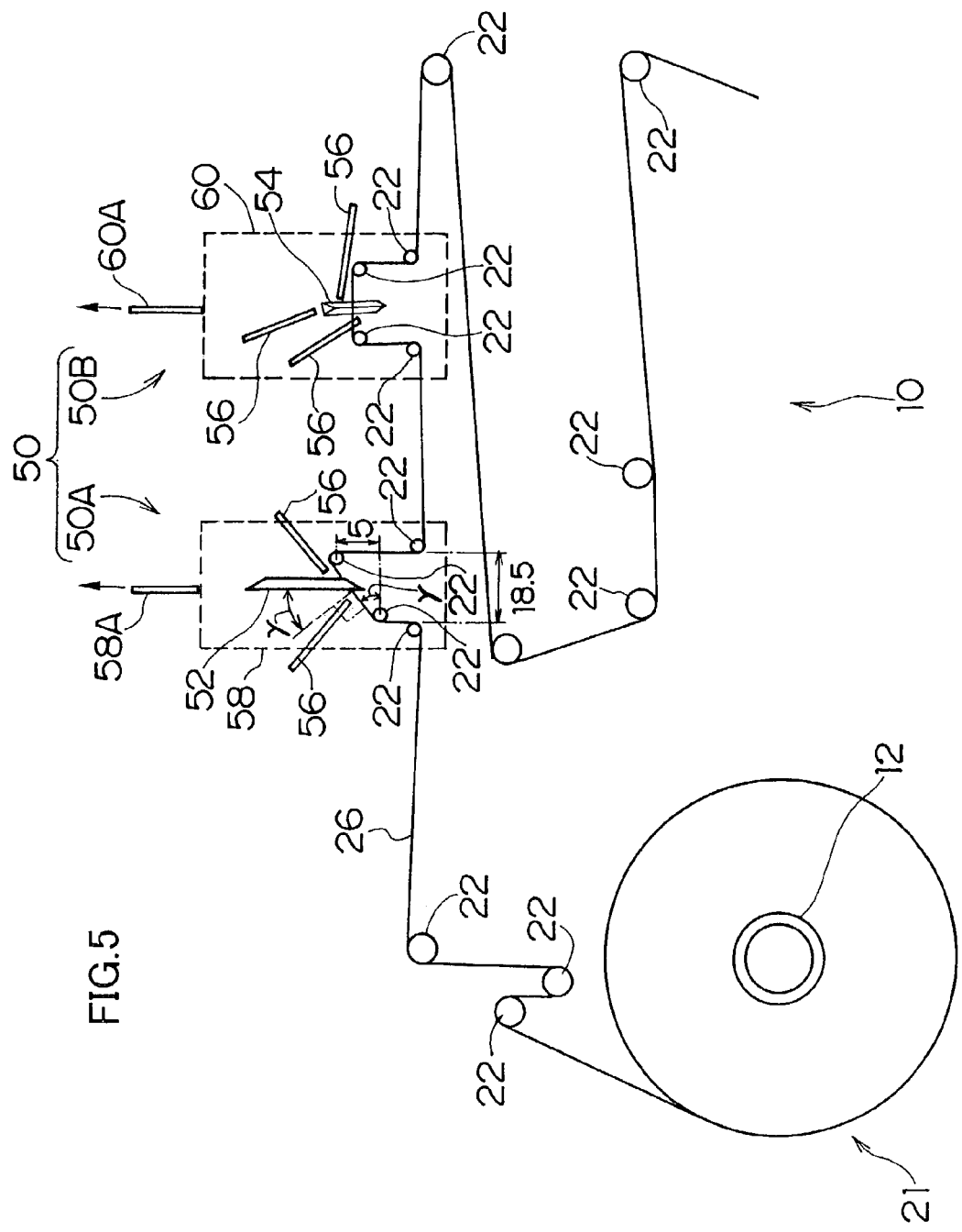
FIG. 5 is a view showing the construction of a projection removal device.

Preferred modes of the projection removal device 50 will be described below by referring to FIGS. 5 to 8. FIG. 5 is a view showing the general construction of the projection removal device 50. Unlike FIG. 1, FIG. 5 shows a construction in which the projection removal device 50 is arranged for performing projection removal during a run of the magnetic tape 26 unwound from the magnetic tape reel 21 after being made by slitting the magnetic tape material with the slitter and wound on the hub 12 (such a magnetic tape wound on the hub of a reel being generally called a pancake). In the construction shown in FIG. 5, the magnetic tape 26 which is being transported is supported by a plurality of guide rollers 22, 22, . . .

In FIG. 5, the projection removal device 50 comprises a front-surface projection removal device 50A which removes a projection on the front surface of the magnetic tape 26 and a back-surface projection removal device 50B which removes a projection on the back surface of the magnetic tape 26. The projection removal devices 50A and 50B are enclosed with suction covers 58 and 60, respectively. Suction pipes 58A and 60A are connected to the suction covers 58 and 60, respectively, and communicate with a suction source (not shown).

The front-surface projection removal device 50A is configured in such a manner that a projection on the magnetic layer 26A of the magnetic tape 26 is removed by a rotary circular blade 52, which rotates on an axis arranged substantially parallel to the running direction of the magnetic tape 26. FIG. 6 is an enlarged partial view of this state as viewed from the side. In FIG. 6, the magnetic tape 26 runs in a direction perpendicular to the drawing sheet. In FIG. 6, the relative position of the magnetic tape 26 with respect to the rotary circular blade 52 is offset in a horizontal direction by a predetermined distance L1 with respect to the central axis of the rotary circular blade 52 and in a vertical direction by a predetermined distance L2 with respect to the central axis of the rotary circular blade 52. Preferred values of L1, L2, etc. will be described later.

Although the outside diameter, thickness, material, etc. of the rotary circular blade 52 and the rotational speed, etc. of the rotary circular blade 52 can be appropriately selected according to the thickness, width, material, etc. of the magnetic tape 26, for example, a rotary circular blade 52 made of cemented carbide having an outside diameter of 95 mm and an edge portion thickness of 1 mm can be used at a rotational speed of 3000 rpm.

The back-surface projection removal device 50B is configured in such a manner that a projection on the nonmagnetic backing layer 26B of the magnetic layer 26 is removed by contact with an edge portion of a fixed blade 54 made of a hard material having a hardness not lower than a predetermined hardness level. FIG. 7(a) is an enlarged partial view of this state as viewed from the side, and FIG. 7(b) is an enlarged partial view of this state as viewed from the above. The magnetic tape 26 runs in a direction perpendicular to the drawing sheet in FIG. 7(a) and in a direction of an arrow in FIG. 7(b).

In FIGS. 7(a) and 7(b) is shown the relation of the relative angle of the magnetic tape 26 to the fixed blade 54. That is, as shown in FIG. 7(a), the magnetic tape 26 is supported so as to assume a posture in which the widthwise direction thereof is vertical, and the fixed blade 54 is disposed in such a manner that the triangular prism of the fixed blade 54 abuts against the nonmagnetic backing layer 26B of the magnetic tape 26 at an angle of β to the horizontal. Furthermore, as shown in FIG. 7(b), the fixed blade 54 having an equilateral triangle section is disposed in such a manner that one side of the equilateral triangle section abuts against the nonmagnetic backing layer 26B of the magnetic tape 26 at an angle of β with respect to the side surface of the magnetic tape 26. Preferred values of α, β, etc. will be described later.

For the fixed blade 54, a triangle prism made of sapphire can be favorably used for reasons of factors such as hardness, workability and cost. In the case of the triangular prism form, with one fixed blade 54 three edge portions of appropriate shape are formed, and in case of wear, the fixed blade 54 can be still used by changing the longitudinal position of the edge portion and further by rotating to use another edge portion, so that the frequency of replacement of the fixed blade 54 can be reduced.

In FIG. 5, as already described, both of the front-surface projection removal device 50A and the back-surface projection removal device 50B are enclosed with the suction covers 58 and 60 so that dust produced from the surface projections removed from the magnetic tape 26 can be sucked and discharged. In order to further improve the dust suction, suction nozzles 56 are provided in two places in the vicinity of the contact point between the rotary circular blade 52 and the magnetic tape 26, and in three places in the vicinity of the contact point between the fixed blade 54 and the magnetic tape 26.

Next, the operation of the magnetic tape manufacturing device 10 configured as described above will be described below. In FIG. 1, first, the magnetic tape material 20 in roll form which is wound on the unwinding reel 11 of the magnetic tape manufacturing device 10 is continuously drawn out of the unwinding reel 11 and transported to the slitter 14. Then, by use of the slitter 14 the magnetic tape material 20 is slit into a plurality of magnetic tapes 26, each of which is wound on the hub 18 of the winding reel 17. As a result of this, for example, the magnetic tape material 20 is slit into 100 to 500 strips, and the magnetic tapes 26 each having a specified width (for example, 12.65 mm, 25.4 mm or 3.81 mm) are produced. On that occasion, projections of the magnetic tape 26 are removed by the projection removal device (not shown in FIG. 1), which is arranged in a predetermined position upstream or downstream of the tension roller 28.

Similarly also in FIG. 5, the magnetic tape 26 is continuously drawn out of the magnetic tape reel 21 (such a magnetic tape wound on a reel being called a pancake) and wound on a tape winding device (not shown) through the plurality of guide rollers 22, 22, . . . and the projection removal device 50. On that occasion, projections on the magnetic tape 26 are removed by the projection removal device 50 (the front-surface projection removal device 50A and the back-surface projection removal device 50B).

So far, an example of the embodiment of a method of manufacturing magnetic tape related to the present invention has been described. However, the invention is not limited to the above-described embodiment and it is possible to adopt various modes.

For example, for the outside diameter, thickness, material, etc. of the rotary circular blade 52 and the rotational speed, etc. of the rotary circular blade 52, various modes can be selected in addition to those described in connection with the above-described embodiment. Also, for the fixed blade 54, it is possible to select various materials and shapes, for example, hard materials such as synthetic diamond and corundum including ruby, and various types of grinding stones in addition to the above-described triangular prism of sapphire.

EXAMPLE

The magnetic tape 26 was produced by use of the magnetic tape manufacturing device 10 of the construction shown in FIG. 5, and projections remaining in the edge portions of the side surfaces of the magnetic tape 26 were evaluated. The magnetic tape 26 in this example had a tape width of 12.650 mm (½ inch). The manufacturing conditions were such that the magnetic tape 26 was drawn out of the magnetic tape reel 21 (a 5000-m winding) at a tape transporting speed of 7 m/second and wound on a tape winding device (not shown) through the projection removal device 50 (the front-surface projection removal device 50A and the back-surface projection removal device 50B).

In the front-surface projection removal device 50A, rotary circular blades 52 made of cemented carbide having outside diameters of 95 to 99 mm (a plurality of blades were used by replacement) and an edge portion thickness of 1 mm were used at a rotating speed of 3000 rpm. The edge deflection (radial deflection) during the rotation of the rotary circular blade 52 was within 0.03 mm. L1 shown in FIG. 6 was set at 5 mm, and L2 in FIG. 6 was adjusted so that the cutting-edge contact depth D of the rotary circular blade 52 shown in FIG. 8 became 20 mm.

FIG. 8 is a conceptual diagram showing a method of controlling the rotary circular blade 52. The control of the cutting-edge contact depth D of the rotary circular blade 52 was performed while irradiating the portion of a spot 70 shown in FIG. 8 with parallel luminous fluxes from the near side on the drawing, causing the part of the irradiated luminous fluxes which were not cut off by the magnetic tape 26 to be received by a photosensor (not shown) disposed on the far side on the drawing, and measuring the quantity of received light, thereby making an adjustment to ensure an appropriate cutting-edge contact depth D.

The angle of intersection γ (the contact angle of the cutting edge with respect to a plane perpendicular to the running direction of the magnetic tape 26) shown in FIG. 5 was an angle of arctangent 5/18.5.

The rotary circular blade 52 was replaced each time after the treatment of 40 magnetic tape reels 21.

In the back-surface projection removal device 50B, a triangular prism made of sapphire having an equilateral triangle section with a side of 5 mm and a length of 35 mm was used as the fixed blade 54. The angle α shown in FIG. 7(a) was varied in the range of 10 to 20 degrees and the angle β was varied in the range of 20 to 30 degrees. The contact point between the fixed blade 54 and the magnetic tape 26 was varied by longitudinally shifting the fixed blade 54 by 0.5 mm each time one magnetic tape reel 21 (one winding) was treated, and after the treatment of 40 magnetic tape reels 21 (after longitudinally shifting the fixed blade 54 by 20 mm), the fixed blade 54 is rotated so as to use another edge thereof.

In the evaluation, by use of an optical defect detection device the magnetic tape was measured in 50 places at intervals of 100 m each time on a run of 5000 m and whether projections remain in the edge portions was evaluated. As a result, it was ascertained that under the above-described operating conditions all the projections formed in the edge portions had been removed. Thus, the effect of the present invention was verified.

As described above, according to the present invention, during a run of a magnetic tape immediately after being made by slitting a magnetic tape material with a slitter or during a run of a magnetic tape when the magnetic tape is unwound from a magnetic tape reel after being made by slitting a magnetic tape material with a slitter and winding on a reel, projections formed on the edge portions can be removed by pushing a cutting tool against the edge portions of side surfaces of the magnetic tape, so that the product quality of the magnetic tape can be easily improved without making a sacrifice of productivity.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of manufacturing magnetic tape, comprising the steps of:
    slitting a magnetic tape material by a slitter;
    transporting a magnetic tape made by slitting the magnetic tape material by the slitter; and
    pressing a cutting tool against a corner of an edge portion of a side surface of the transported magnetic tape after the slitting, thereby removing a projection formed in the corner of the edge portion of the side surface of the magnetic tape due to the slitting,
    wherein the cutting tool is a blade which is separately provided from the slitter.

2. The method as defined in claim 1, wherein the cutting tool to remove the projection on a magnetic layer of the magnetic tape is a rotary circular blade rotating on an axis substantially parallel to a running direction of the transported magnetic tape.

3. The method as defined in claim 1, wherein the cutting tool to remove the projection on a nonmagnetic backing layer of the magnetic tape is a fixed blade made of a hard material.

4. The method as defined in claim 1, wherein the cutting tool scrapes the edge portion of the side surface of the magnetic tape.

5. The method as defined in claim 1, wherein the cutting tool to remove the projection on a magnetic layer of the magnetic tape is a rotary circular blade and a direction of a tangential velocity of the rotary circular blade at a point of contact between the rotary circular blade and the magnetic tape is not parallel to a conveying direction of the magnetic tape at the point of contact.

6. The method as defined in claim 3, wherein fixed blade is disposed against the edge portion of the side surface so that the fixed blade is not parallel to a width of the magnetic tape, the width of the magnetic tape being substantially perpendicular to the running direction.

7. The method as defined in claim 1, wherein the cutting tool removes the projection by applying a shearing force against the projection in a direction substantially parallel to a conveying direction of the magnetic tape at a point of contact with the cutting tool.

* * * * *